US012638827B2

(12) United States Patent
Koziolek et al.

(10) Patent No.: US 12,638,827 B2
(45) Date of Patent: May 26, 2026

(54) VISUAL INTERLOCK SPECIFICATION FOR INDUSTRIAL AUTOMATION

(71) Applicant: ABB Schweiz AG, Baden (CH)

(72) Inventors: Heiko Koziolek, Karlsruhe (DE);
Andreas Burger, Weingarten (DE);
Marie Christin Platenius-Mohr,
Hirschberg an der Bergstraße (DE);
Hadil Abukwaik, Weinheim (DE);
Julius Rueckert, Langen (DE)

(73) Assignee: ABB Schweiz AG, Baden (CH)

( * ) Notice: Subject to any disclaimer, the term of this patent is extended or adjusted under 35 U.S.C. 154(b) by 539 days.

(21) Appl. No.: 18/297,107

(22) Filed: Apr. 7, 2023

(65) Prior Publication Data

US 2023/0244212 A1 Aug. 3, 2023

Related U.S. Application Data

(63) Continuation of application No. PCT/EP2021/073654, filed on Aug. 26, 2021.

(30) Foreign Application Priority Data

Oct. 8, 2020 (EP) .................................... 20200904

(51) Int. Cl.
G05B 19/4155 (2006.01)
(52) U.S. Cl.
CPC .................... G05B 19/4155 (2013.01); G05B 2219/32168 (2013.01)
(58) Field of Classification Search
CPC ...... G05B 19/4155; G05B 2219/32168; G05B 2219/32085; G05B 2219/32088; G05B 19/41885; H04L 41/22; Y02P 90/02
See application file for complete search history.

(56) References Cited

U.S. PATENT DOCUMENTS 6,369,836 B1 4/2002 Larson et al.
6,448,982 B1 9/2002 Klapper et al.
(Continued)

FOREIGN PATENT DOCUMENTS

CN 111562769 A 8/2020
EP 3364261 A1 8/2018
(Continued)

OTHER PUBLICATIONS

Hidalgo et al., "Development of an analyzing and tuning technology for improving circularity of cone-frustum motions of five-axis CNC machine tools," *The International J. of Advanced Manufacturing Technology*, 97: 15 pp. (May 24, 2018).
(Continued)

*Primary Examiner* — Chad G Erdman
(74) *Attorney, Agent, or Firm* — Fitch Even Tabin & Flannery LLP

(57) ABSTRACT

A method for visualizing a rule of an industrial process includes providing a topology model of the industrial process, wherein the industrial process comprises at least one sensor and at least one actuator; attributing the topology model with a rule comprising a triple <cause, traversal, effect>, wherein the cause comprises a range of values from the at least one sensor, the effect comprises an action performed by the at least one actuator, and the traversal comprises a relation between the cause and the effect; marking the cause, the traversal and/or the effect; and visualizing the elements of the rule in the topology model.

10 Claims, 6 Drawing Sheets

(56)                    References Cited

U.S. PATENT DOCUMENTS

| 9,367,064 | B2 | 6/2016 | Gohr et al. | |
|-----------|----|--------|-------------|---|
| 9,411,333 | B2 | 8/2016 | Gohr | |
| 2004/0073404 | A1 | 4/2004 | Brooks et al. | |
| 2005/0015217 | A1* | 1/2005 | Weidl | G05B 17/02 |
| | | | | 702/185 |
| 2007/0276514 | A1 | 11/2007 | Martinez et al. | |
| 2009/0292514 | A1* | 11/2009 | McKim | G09B 19/003 |
| | | | | 703/6 |
| 2013/0138227 | A1* | 5/2013 | Gohr | G05B 23/0286 |
| | | | | 700/80 |
| 2017/0205819 | A1 | 7/2017 | Machida et al. | |
| 2018/0224831 | A1* | 8/2018 | Liu | G05B 23/0232 |
| 2023/0205940 | A1* | 6/2023 | Narue | G06F 30/12 |
| | | | | 703/1 |

FOREIGN PATENT DOCUMENTS

| JP | 2002-333918 | | 11/2002 |
|----|-------------|---|---------|
| JP | 2016-505909 | | 2/2016 |
| JP | 2016-095852 | | 5/2016 |
| JP | 2017-207912 | | 11/2017 |
| JP | 2018-073055 | A | 5/2018 |
| JP | 2019-121113 | | 7/2019 |

OTHER PUBLICATIONS

Zhang et al., "Research on the formal verification process of interlocking software based on Prover," *Railway Signalling and Communication*, 56(3): 6 pp. (Mar. 17, 2020).

The Patent Office of the People's Republic of China, Office Action in Chinese Patent Application No. 202180055901.9, 9 pp. (Jul. 13, 2024).

Lau et al., "Ecological Interface Design in the Nuclear Domain: An Application to the Secondary Subsystems of a Boiling Water Reactor Plant Simulator," *IEEE Transactions on nuclear science*, 55(6): 3579-3596 (Dec. 2008).

European Patent Office, International Search Report in International Patent Application No. PCT/EP2021/073654, 4 pp. (Oct. 1, 2021).

European Patent Office, Written Opinion in International Patent Application No. PCT/EP2021/073654, 7 pp. (Oct. 1, 2021).

European Patent Office, Extended European Search Report in European Patent Application No. 20200904.9, 9 pp. (Mar. 31, 2021).

* cited by examiner

VISUAL INTERLOCK SPECIFICATION FOR INDUSTRIAL AUTOMATION

CROSS-REFERENCE TO RELATED APPLICATIONS

This patent application claims priority to International Patent Application No. PCT/EP2021/073654, filed on Aug. 26, 2021, and to European Patent Application No. 20200904.9, filed on Oct. 8, 2020, each of which is incorporated herein in its entirety by reference.

FIELD OF THE DISCLOSURE

The present disclosure relates to the field of methods for industrial processes, particularly for industrial plants and/or processes, for instance in chemical, mechanical, and/or other production and/or handling processes.

BACKGROUND OF THE INVENTION

For a description of industrial plants and/or processes, in many cases so-called "interlocks" are used. Algorithms may perform those interlock specifications, e.g., by taking plant topology models from process engineers as a basis for their construction. However, in at least some cases, a safety engineer, service personnel and/or other persons whose work is related to these plants and/or processes, may not trust such algorithms, for example in cases when they are run automatically, and may thus fall back to manual interlock specification, which may be laborious and error-prone.

BRIEF SUMMARY OF THE INVENTION

In one general aspect, the present disclosure describes an improved capability for checking a behaviour of industrial plants and/or processes.

One more particular aspect relates to a method for visualizing a rule of an industrial process or processing system. The method comprises the steps of: Providing a topology model of the industrial process or processing system, wherein the industrial process or processing system comprises at least one sensor and at least one actuator; Attributing the topology model with a rule, wherein the rule comprises a triple <cause, traversal, effect>, wherein: the cause comprises a range of values from the at least one sensor, the effect comprises an action performed by the at least one actuator, and the traversal comprises a relation between the cause and the effect; marking the cause, the traversal and/or the effect; and visualizing the elements of the rule in the topology model.

The industrial process may be an industrial automation application and/or an industrial process, particularly in an industrial plant, for instance in chemical, mechanical, and/or other production and/or handling processes. The rule—or a plurality of rules—may be part of a so-called interlock specification, which describes at least some aspects of the industrial process. Rules may link two or more devices, e.g., based on a functionality on which the devices are interlocked. At least some interlock specifications may comprise rules, which may represent the devices' relations, e.g., their functional and/or other relations. Rules may comprise safety restrictions. For example, a pump may only be started if a valve on its outlet is opened, in order to prevent overpressure.

BRIEF DESCRIPTION OF THE SEVERAL VIEWS OF THE DRAWING(S)

DETAILED DESCRIPTION OF THE INVENTION

Figure 1:
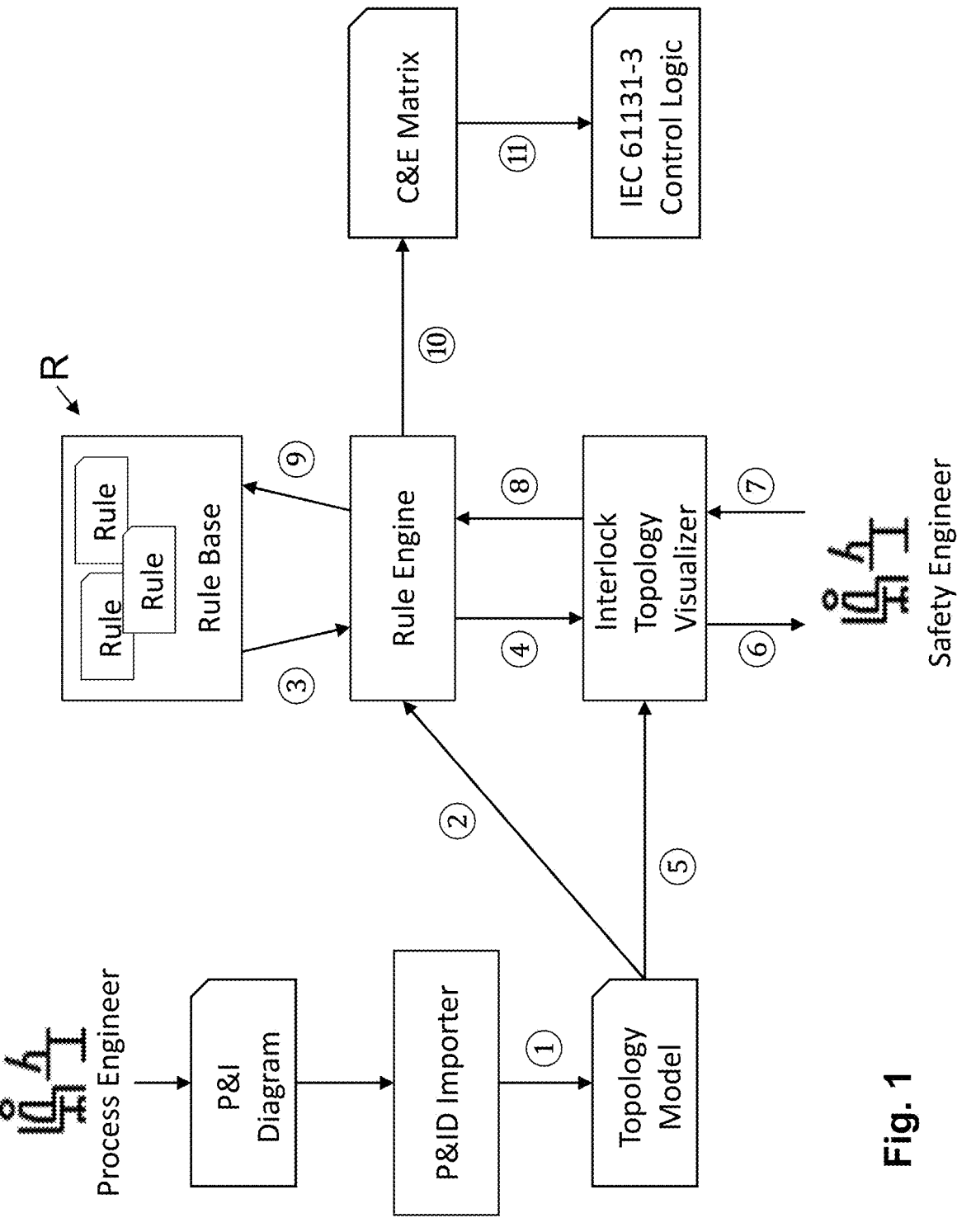
FIG. 1 is a functional diagram for a method according to an embodiment of the present disclosure.

FIG. 1 shows steps of a method according to an embodiment. Not all steps shown here need to be performed in every embodiment. FIG. 1 depicts components, e.g., software components, as rectangles and artefacts, e.g., tables and/or other representations that may possibly be stored in a memory as rectangles with bevelled corner. FIG. 1 depicts a process engineer who feeds P&I diagrams into a P&ID Importer, which extracts in a step 1 a topology model out of the P&I diagram. The topology model normalizes the diagram for different types of shapes and naming conventions and may further strip information not relevant for interlock specification, e.g., manual valve elements, specific equipment properties, or versioning annotations. The Rule Engine processes the topology model in a step 2 by identifying equipment that could be relevant for interlock generation. It applies in a step 3 rules, e.g., in form of pre-specified if-then-rules, from a Rule Base, by checking whether the if-clause occurs in the topology model and if a path can be constructed from a "cause" equipment to an "effect" equipment. For example, if a high/high temperature alarm is specified in a tank ("cause"), a "traversal" on the topology model from the tank to a heat exchanger ("effect") is attempted, and, if successful, the according signal to stop the heat exchanger during runtime could be linked to this cause. Such rules may be encoded, e.g., by domain experts or reverse engineered from former manual specifications.

Then, the Rule Engine passes in a step 4 the identified interlock elements to the Interlock Topology Visualizer. This component creates a custom view on the topology model that focuses on the elements relevant for the identified interlock and a restricted number of contextual elements in a step 5. It then visually marks up the cause, traversal path, and the effect, for instance by using a transparent—possibly coloured—overlay. A safety engineer responsible for interlock specification gets this visualization displayed, e.g., on a screen in a step 6. The safety engineer can then approve, reject, etc. the identified interlock via a user interface in a step 7, which feeds the information back to the Rule Engine in a step 8. The correction may be carried out by manipulating the cause-and-effect markers in the visualization as well as adjusting the path topology.

The Rule Engine may train a machine learning model, e.g., an artificial neural network, ANN, that supports the interlock generation algorithms. Based, e.g., on contextual information, the safety engineer's decision and the history of applying a specific rule, the Rule Engine may either refine a rule or adjust the specific mechanisms suggesting the rules for a given topology model in a step 9. Steps 3 to 9 may be applied repeatedly, until all rules have been applied on the entire topology model. Afterwards, the Rule Engine may generate a C&E matrix in a step 10 that may possibly be extended manually, reviewed later, e.g. by other engineers. In a step 11, the C&E matrix may be imported into control logic generation tools, for instance according to IEC 61131-3.

As a variant, a safety engineer may utilize the Interlock Topology Visualization to specify new interlocking rules visually, e.g., by drawing overlays on the topology model. In another variant—particularly in brownfield scenarios—, existing interlocking control logic in an automation system may be reversed-engineered into a C&E matrix and be compared to a matrix generated by the system. This may aid keeping the specifications consistent and may contribute to detect any undesired violations.

Hence, a visual overlay or another kind of visualizing generated C&Es on top of customized, streamlined plant topology model cut-out is provided. This delivers a mechanism that allows safety engineers and/or other personnel that run the process interact with rule engine. Furthermore, a machine learning model may be trained with human inputs in the context of interlock specification. For example, the Rule Engine may incorporate engineer decisions as "learnings"; contextual information may be recorded for an interlock/C&E situation, the ML algorithm may be recalibrated, e.g., by adjusting weights in the ANN accordingly. Additionally, reverse engineering IEC 61131 control logic into a C&E matrix and comparing the original C&E matrix against it may be performed. According to the methods described above and/or below, a tool allowing visual specification of new interlock rules by marking up equipment, drawings paths, and assigning cause/traversal/effect properties to them is made available. Besides, an automatic path proposer by calculating the shortest path between specified C&Es may be added. The method shown may lead to faster engineering of interlocks, to a reuse of existing knowledge encoded in rules, is advantageously less error-prone than, e.g., manual and/or "media-breaking" approaches, may contribute to avoid human oversights, and/or may contribute to avoid artefact inconsistencies.

Figure 2:
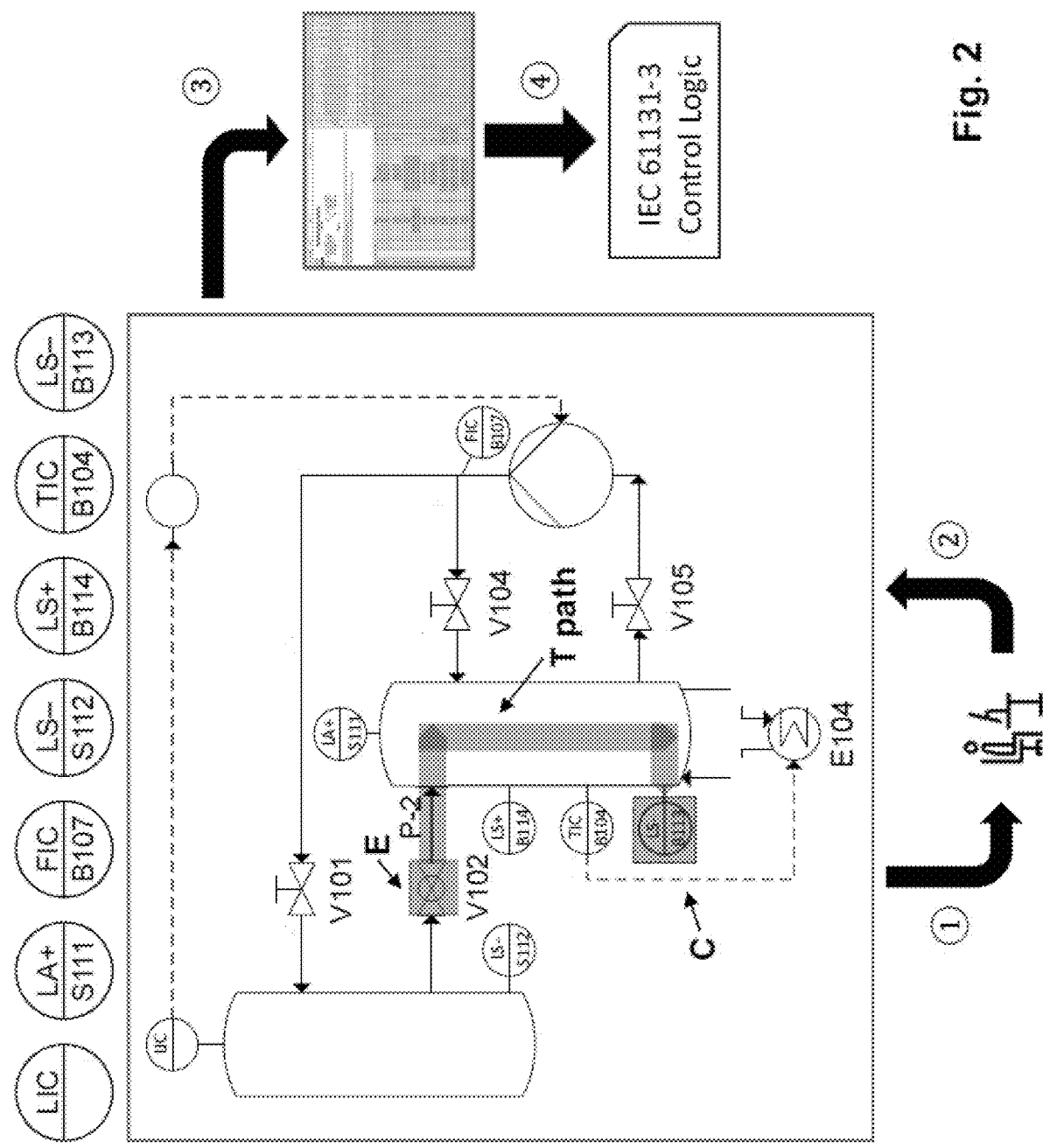
FIG. 2 is a functional diagram of additional or alternative steps of a method according to an embodiment of the present disclosure.

FIG. 2 shows additional or alternative steps of a method according to an embodiment. In a step 1, a visual feedback is provided to an engineer by the visualizing tool as described above and/or below. In a step 2, the engineer approves, rejects, etc. the identified interlock via a user interface. This may be done repeatedly. In a step 3, a C&E matrix may be generated from the verified interlock topology. In a step 4, the C&E matrix may be imported into control logic generation tools, for instance according to IEC 61131-3.

Figure 3:
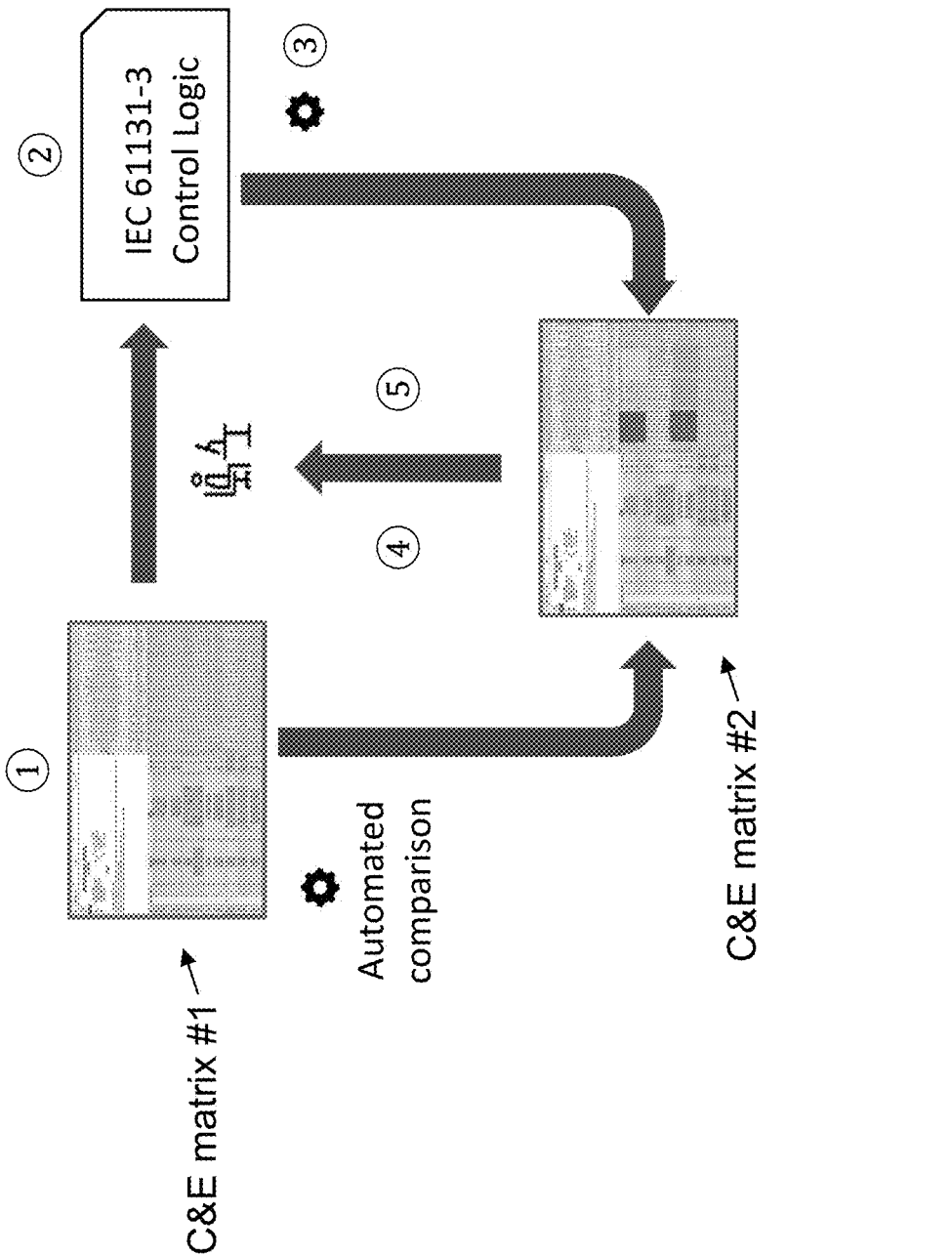
FIG. 3 is a block diagram of additional or alternative steps of a method according to an embodiment of the present disclosure.

FIG. 3 shows additional or alternative steps of a method according to an embodiment. By this, checking control logic against customer specification of interlocks by using C&E matrices may be performed. In a step 1, customer input is given, e.g., in form of a C&E matrix #1. In a step 2, control logic—e.g., compliant to IEC 61131-3—is generated. In a step 3, automated reverse engineering may be done by generating C&E matrix #2; this may be compared it to C&E matrix #1 for consistency check. In a step 4, feedback is given to an engineer. This person may, then, approve, reject, etc. the identified interlock via a user interface.

Figure 4:
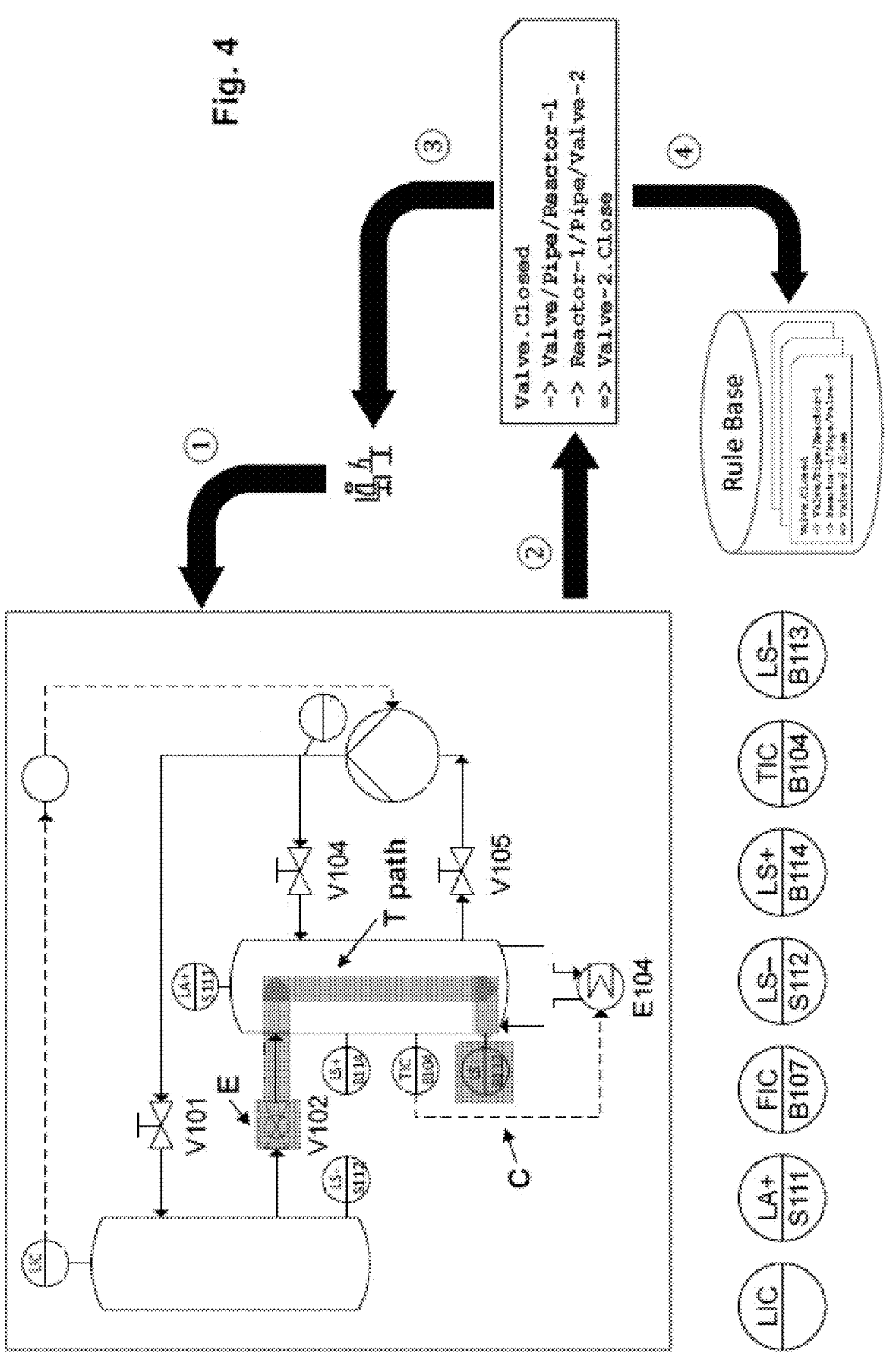
FIG. 4 is a functional diagram of additional or alternative steps of a method according to an embodiment of the present disclosure.

FIG. 4 shows additional or alternative steps of a method according to an embodiment. In a step 1, a generic rule is specified by an engineer—e.g. a domain expert, process engineer, or knowledge engineer-using P&ID shapes. This is a basis for checking an interlock specification as described above and/or below. In a step 2, an automated translation of the rule into formal language is performed.
One syntax that may be used looks like this:
Valve.Closed
→Valve/Pipe/Reactor-1
→Reactor-1\Pipe\Valve-2
=>Valve-2.Close In the example shown, closing a valve on a pipe feeding a reactor leads to closing another valve on another pipe also feeding the reactor. The character "/" indicates a traversal of the topology model in the direction of the material or logical flow, while the character "\" indicates a traversal of the topology model in the direction opposite to the material or logical flow. The example interlocks all the valves feeding a reactor and causes all of them to close once one of them is closed.

In a step 3, an automated check and is done and feedback is given to the engineer.

In a step 4, based on the feedback, an existing rule is matched, or a new rule is created.

Figure 5:
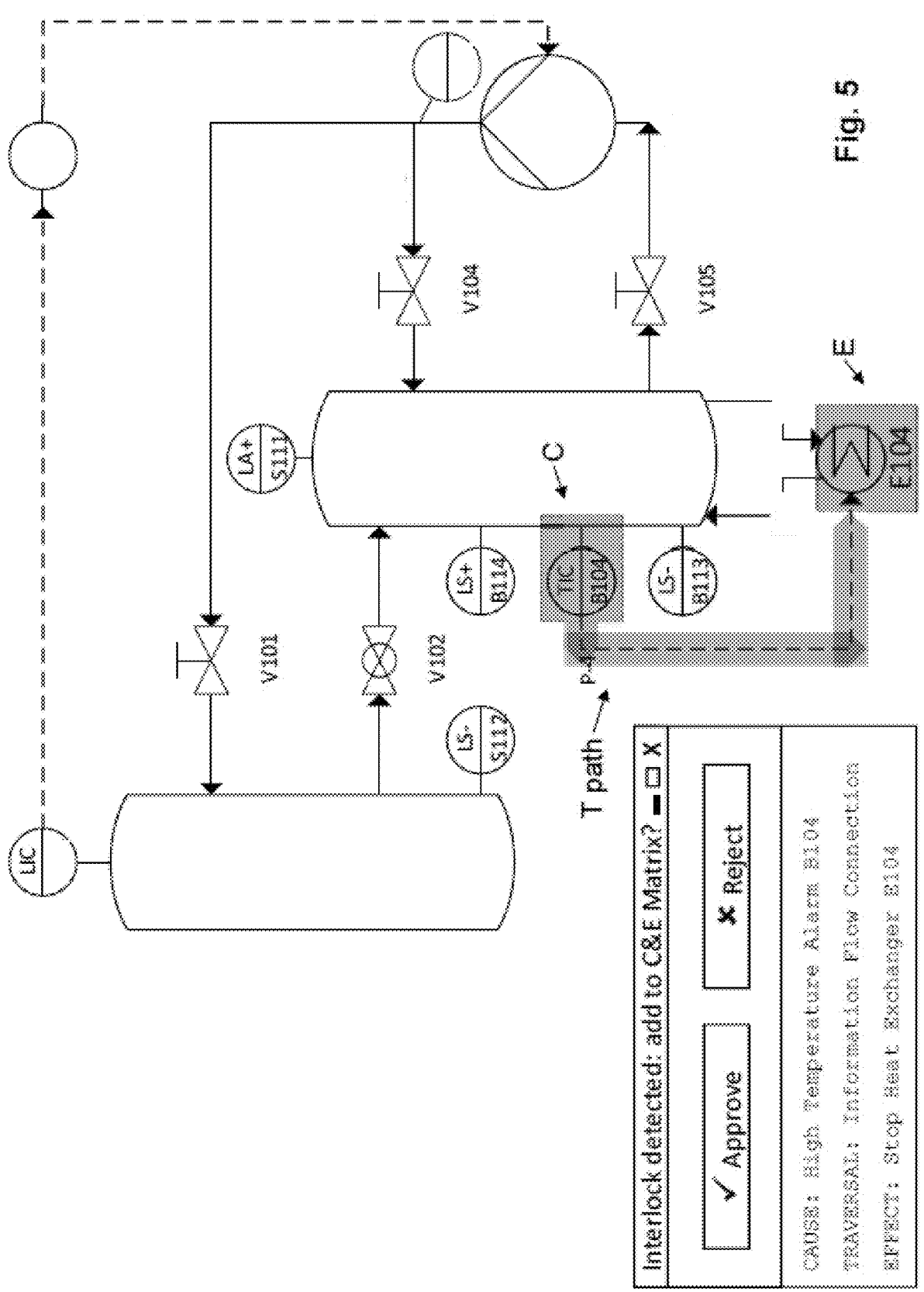
FIG. 5 is a visualizing example in diagram form according to an embodiment of the present disclosure.

FIG. 5 shows a visualizing example according to an embodiment. In this example, a sensor B104 gives a "High Temperature Alarm" as "cause" C. Via the "traversal" T path "Information Flow Connection" P-4, this signal is forwarded to the "effect" E, namely to an actuator "Heat Exchanger E104", which is stopped by this rule. One syntax that may be used looks like this:

CAUSE: High Temperature Alarm B104
TRAVERSAL: Information Flow Connection
EFFECT: Stop Heat Exchanger E104

In the tool, the "cause" C, the "transversal" T or transversal path, and the "effect" E may be highlighted. Furthermore, a window displaying this rule may be shown, and a checkbox "Approve/Reject" may be displayed. Then, an engineer may approve or reject the highlighted rule.

Figure 6:
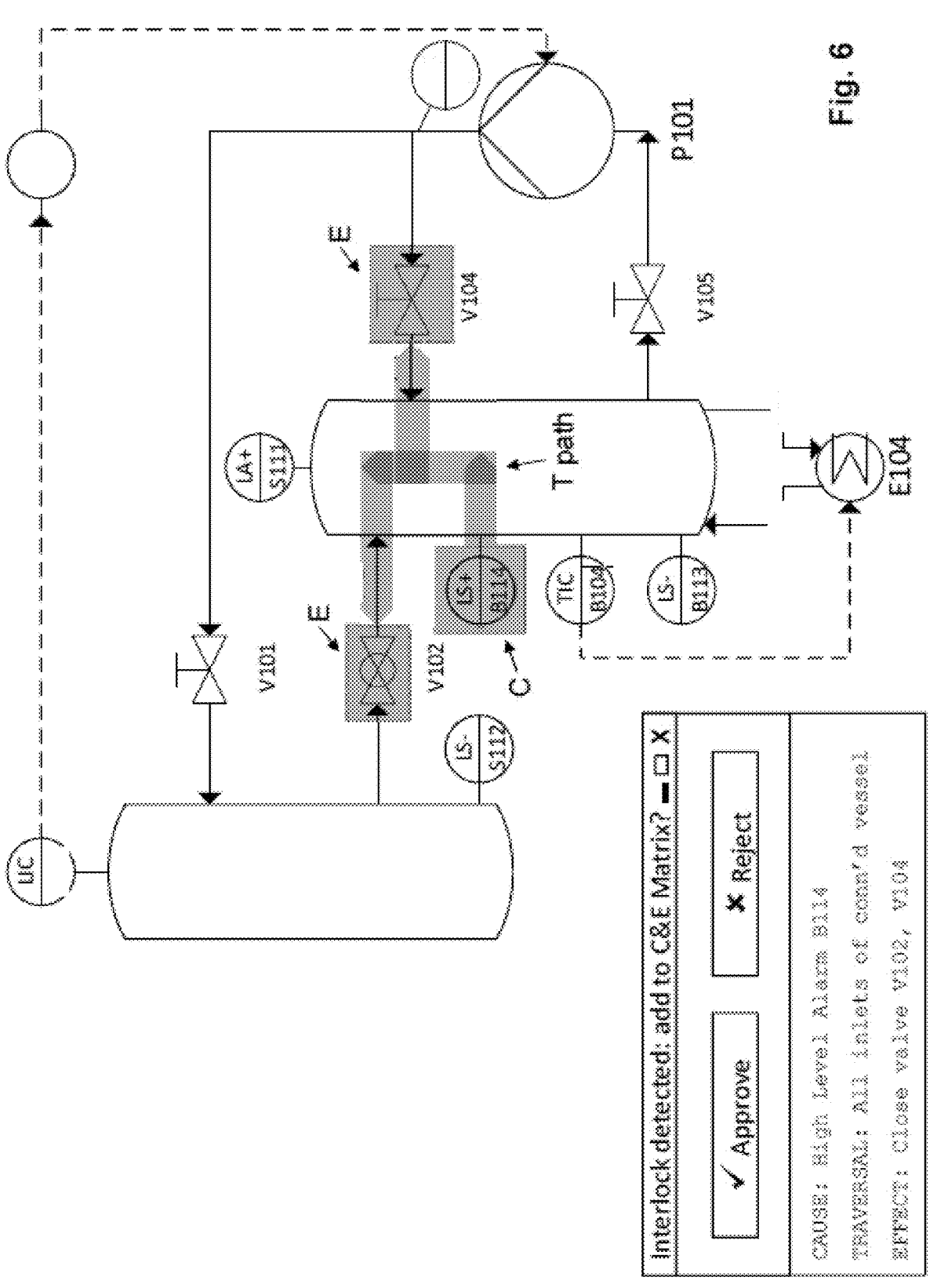
FIG. 6 is an additional visualizing example in diagram form according to an embodiment of the present disclosure.

FIG. 6 shows a further visualizing example according to an embodiment. This example depicts two actuators that are impacted by a rule. The rule looks like this:

CAUSE: High Level Alarm B114
TRAVERSAL: All inlets of connected vessel
EFFECT: Close valve V102, V104

Hence, the sensor "High Level Alarm B114", as "cause" C, makes, as "effect" E, to Close valve V102, V104.

Visualizing may be performed on a visual interface of a computing device, e.g. on a display, a screen, a touch-screen, a beamer, and/or the like. The visualizing may comprise generating a visual specification, e.g., of an interlock specification. The visualizing may be implemented as a computer-implemented method.

The topology model of the industrial process may describe by visual means elements of the process or plants and their connectivity, e.g., pipes, vessels, etc. for carrying fluids and/or media, electric connections, mechanical, logical, and/or other connections. The topology model comprises at least one sensor and one actuator. These devices of the topology model, of course, strongly depend on the kind of process or plant they are used in. Sensors may, e.g., comprise a metering device for pressure, temperature, light, sound, etc., including complex devices, e.g., for distances, flows, chemical analyses and/or for further purpose. Actuators may, e.g., comprise switches, valves, heaters, coolers, mixers, etc. that are configured to make a physical effect.

For the interlock specification, the topology model is attributed with a rule—or a plurality of rules—, wherein each rule comprises a triple <cause, traversal, effect>.

The rule may comprise further entries. The entry "cause" comprises a range of values from the at least one sensor. The range of values may come directly from one or more sensors, or it may be pre-processed and/or a result of linking several sensors. The entry "effect" comprises any action performed by the actuator (or a plurality of them), depending on the type of actuator. The entry "traversal" comprises a relation between the cause and the effect. One or more causes may contribute to one or more effects. One or more causes may be logically (AND, OR . . . ) and/or otherwise connected, e.g. via functions. One or more effect may be logically and/or otherwise connected, e.g., via functions.

Marking the cause, the traversal and/or the effect may, e.g., be implemented by a click and/or another input on one or more sensors, on one or more actuators, on one or more traversal paths of the topology model, and/or by marking a rule (or "line") of the interlock specification. The visualizing of the elements of the rule in the topology model may, e.g., be implemented by highlighting the components impacted, e.g., by colouring the related elements and/or their backgrounds. Additionally, or as an alternative, the related rule may be shown, e.g., on the visual interface of a computing device. The visualizing may be accompanied by further actions.

This may provide an improved capability for accessing a behavior of industrial plants and/or processes. It may advantageously contribute to a visual interlock specification that provides safety engineers and/or other persons working with the process or plant with visual feedback on algorithmic interlock specifications. As a further result, this method may allow faster engineering of interlocks, may reuse existing domain-specific knowledge, may be less error-prone, and may reduce or avoid costly inconsistencies in specifications, e.g., in an interlock specification and/or other specifications of plants and/or processes.

In various embodiments, the topology model is attributed with a rule, based on visual means. This may be performed, e.g., by marking a cause and an effect—e.g., by "clicking" on them—and writing and/or visually programming a further relation between the cause and the effect. This further contributes to an intuitive handling of the model.

In various embodiments, the method further comprises the step of approving or acknowledging the rule, particularly an interlock detected by the rule. This may be done by a safety engineer and/or other personnel responsible for the process or plant. This may advantageously contribute to a higher level of trust in the specification(s).

In various embodiments, the method further comprises the step of rejecting the rule, particularly an interlock detected by the rule. This may advantageously be part of a fast and intuitive "debugging process" of the process' or plant's specification(s).

In various embodiments, the method further comprises the step of refining the rule, particularly an interlock, by performing at least one of: adding a further cause; adding a further effect; adding a further traversal; and/or adding a further element to the rule. The further element may, e.g., be a comment, a further output (e.g., an acoustic signal, a message, etc.), and/or a connection e.g., to a database or another interface. Formally spoken, the rule-triple may thus become an n-tuple (with n>3). This may advantageously contribute to a more intuitive way of engineering the plant.

The approving, rejecting, and/or refining may be tracked, e.g. by means of a logging journal.

In various embodiments, the method further comprises the step of generating the topology model of the industrial process from a Piping-and-Instrumentation Diagram, P&ID, of the industrial process. So far, at least some safety engineers may enter instrument references from I/O lists and/or P&IDs by hand and often add free-text annotations. That manual construction may lead to inconsistencies between different artifacts, e.g., misspelled instrument references leading to inconsistent P&ID. As a consequence of the method as described above and/or below, the plant topology information may be derived from P&IDs, thus reducing an error-prone "media-break."

In various embodiments, the topology model comprises a plurality of rules. This may bring the benefit of being able to deal with complexity. So far, P&IDs, C&E (Cause & Effect) matrices, and/or further means may be used, which may be less intuitive than methods that comprise visualizing steps. The cognitive load of analysing complex P&IDs with thousands of elements and incorporating various safety regulations and customer requirements may also lead to oversights, e.g., missed required interlocks. While C&E matrices are typically thoroughly reviewed, errors or gaps may propagate into the automation system and cause harm to equipment or human workers. Furthermore, expensive clarifications and feedback loops between safety engineer and control engineer may be required. Rule-based engineering approaches using interlock specifications may offer a good compromise between highly optimized plants and reusable plant knowledge in the form of interlocking rules. However, they may suffer due to an insufficiently intuitive user feedback on how a rule was applied and which subset of the plant topology was involved. This may be a reason why at least some safety engineers do not rely on these tools. Hence, the methods as described above and/or below may contribute to improve this situation.

In various embodiments, the method further comprises the step of applying at least one step of the methods as described above and/or below to each rule of the plurality of rules. By applying these methods, a kind of completeness of checking the plant's behaviour may be achieved. Consequently, this semi-automated method—and also a system that is configured to run this method—may contribute to enable safety engineers to quickly generate C&E matrices improving or assuring correctness via visual feedback. Applying the methods may comprise to feed P&I diagrams by a process engineer for a process plant into a software tool, where a rule engine may process them to generate interlocks based on pre-specified, domain-specific rules. The result may be displayed, for instance, as a visual overlay to the P&I diagram or topology model, which includes marking up the causing equipment, the traversal paths, and the effected equipment. A process engineer may evaluate this visual representation and approve, reject, correct and/or otherwise deal with the generated Cause & Effect relationships. The approval step may be advantage due to a high heterogeneity of at least some industrial plants with many possibilities of assembling the equipment. Furthermore, this may improve the safety engineer's trust to trust in the methods.

In various embodiments, the method further comprises the step of generating a Cause & Effect, C&E, matrix from the topology model of the industrial process. Since at least some persons trust this representation more than other methods, this advantageously may help to close "media breaks" between several representations used by different engineers.

In various embodiments, the method further comprises the step of generating a Control Logic according to IEC 61131-3 from the C&E matrix of the industrial process. This advantageously may make at least some parts or aspects of an interlock specification directly applicable to processes or sub-processes of a plant.

In various embodiments, the method further comprises the step of generating a Piping-and-Instrumentation Diagram, P&ID, from the topology model of the industrial process. This may further contribute to better understand and/or verify the interlock specification and/or the topology model.

In various embodiments, the method further comprises the step of: If at least two rules relate to the same sensor, checking the related causes for overlapping ranges and/or gaps between their ranges. The "cause" may comprise a range of values from the at least one sensor, which are not necessarily consistent, e.g. by typing and/or by construction errors. This may contribute to reducing such consistency errors.

In various embodiments, the method further comprises the step of: If at least two rules relate to the same actuator, checking the related effects for intersections. For example, if two power sources drive an electric motor, this method may be able to check if their cooperation is non-destructive. This check may be done rule-based.

An aspect relates to a non-transitory computer-readable storage medium having a program stored therein, which, when executed on a processor, instructs the processor to perform a method according to any one of the preceding claims.

An aspect relates to an artificial neural network, ANN, configured to be trained by and/or to perform the method of checking if at least two rules related to the same sensor and/or if at least two rules relate to the same actuator and evaluating the consequences of that. For that, the ANN may be trained with inconsistencies and/or destructive cooperation behaviour, e.g., of actuators and/or their controls. Additionally, or as an alternative, a machine learning model may be trained based on the engineer's decisions regarding the rule application.

The system adds the approved Cause & Effect relationships to a matrix, which can subsequently be fed to control logic generation tools. In parallel, the system trains a machine learning mechanism (e.g., a neural network) using the decisions of the safety engineer. This may refine the rule base and improve the quality of interlock generation in later runs. The solution may lower the potential for errors or oversights, since the tag names of the devices or the equipment may be directly derived from the original P&I diagram without manual intervention. Furthermore, the rule engine may be enabled to process complex topologies and may thus be prevented from suffering from cognitive overload. As existing domain knowledge is encoded into rules, it may be reused with limited effort. Additionally, the safety engineer may retain full control over the process and may add interlocks to the generated C&E matrix manually, including issuing peer-reviews.

Additionally, or alternatively, the system also allows the engineer to visually specify new interlock rules by marking up equipment, drawings paths, and assigning properties of cause, traversal, and/or effect to them.

An aspect relates to a use of a method as described above and/or below for checking a safety and/or a specification of an industrial process.

For further clarification, the invention is described by means of embodiments shown in the figures. These embodiments are to be considered as examples only, but not as limiting.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for visualizing a rule of an industrial process or processing system, the method comprising the steps of:
  providing a topology model of the industrial process, wherein the industrial process comprises at least one sensor and at least one actuator;
  attributing the topology model with a rule, wherein the rule comprises a triple <cause, traversal, effect>, wherein:
  the cause comprises a range of values from the at least one sensor,
  the effect comprises an action performed by the at least one actuator, and the traversal comprises a relation between the cause and the effect;

marking the cause, the traversal and/or the effect; and visualizing the elements of the rule in the topology model, wherein the topology model comprises a plurality of rules, when at least two rules relate to the same sensor, checking the related causes for overlapping ranges and/or gaps between their ranges, and/or when at least two rules relate to the same actuator, checking the related effects for intersections.

2. The method of claim 1, wherein attributing the topology model with a rule is based on visual means.

3. The method of claim 1, further comprising the step of approving the rule or rejecting the rule.

4. The method of claim 1, further comprising the step of refining the rule, by performing at least one of:

adding a further cause;

adding a further effect;

adding a further traversal; and/or adding a further element to the rule.

5. The method of claim 1, further comprising the step of generating the topology model of the industrial process from a Piping-and-Instrumentation Diagram (P&ID) of the industrial process.

6. The method of claim 1, further comprising approving or rejecting each of the plurality of rules.

7. The method of claim 6, further comprising the step of generating a Cause & Effect (C&E) matrix from the topology model of the industrial process.

8. The method of claim 7, further comprising the step of generating a Control Logic according to IEC 61131-3 from the C&E matrix of the industrial process.

9. The method of claim 1, further comprising the step of generating a Piping-and-Instrumentation Diagram (P&ID) from the topology model of the industrial process.

10. The method of claim 1, wherein the method is a computer executable method that includes instructions stored in tangible media that, when executed by a computer, carry out the steps.

* * * * *